United States Patent [19]

Agarwal

[11] Patent Number: 5,129,995
[45] Date of Patent: Jul. 14, 1992

[54] PYROLYSIS PROCESS AND APPARATUS

[75] Inventor: Kedar B. Agarwal, Troy, Mich.

[73] Assignee: General Motors Corporation, Detroit, Mich.

[21] Appl. No.: 655,920

[22] Filed: Feb. 14, 1991

Related U.S. Application Data

[63] Continuation-in-part of Ser. No. 473,519, Feb. 1, 1990.

[51] Int. Cl.$^5$ .............................................. B09B 3/00
[52] U.S. Cl. .................................... 201/21; 75/403
[58] Field of Search ................. 75/403; 201/21, 2.5

[56] References Cited

U.S. PATENT DOCUMENTS

| | | | |
|---|---|---|---|
| 3,346,417 | 10/1967 | Ehrlich | 75/403 |
| 3,656,735 | 4/1972 | Eliot | 75/403 |
| 3,821,026 | 6/1974 | Swartz | 75/403 |
| 3,983,009 | 9/1976 | Neal et al. | 202/93 |
| 4,038,152 | 7/1977 | Atkins | 201/2.5 |
| 4,077,847 | 3/1978 | Choi et al. | 201/21 |
| 4,078,973 | 3/1978 | Choi et al. | 201/21 |
| 4,091,825 | 5/1978 | Baker | 75/403 |
| 4,147,593 | 4/1979 | Frischmuth et al. | 201/21 |
| 4,297,201 | 10/1981 | Jones et al. | 208/11 |
| 4,357,402 | 3/1983 | Durai-Swamy | 208/8 R |
| 4,401,513 | 8/1983 | Brewer | 202/97 |
| 4,412,889 | 11/1983 | Oeck | 202/117 |
| 4,439,209 | 3/1984 | Wilwerding et al. | 48/76 |
| 4,647,443 | 3/1987 | Apffel | 423/449 |
| 4,648,328 | 3/1987 | Keough | 220/229 |
| 4,774,895 | 10/1988 | Christmann | 110/234 |

FOREIGN PATENT DOCUMENTS 360171A 3/1990 European Pat. Off. .

OTHER PUBLICATIONS

"Kleenair" Pyrolysis Process-a page from Conrad Industries Inc.'s advertising brochure; 143, 1987.
W. Kaminsky, *Pyrolysis of Plastic Waste and Scrap Tyres in a Fluid Bed Reactor*, Resource Recovery Conservation, 5(3), 205 (1980).

*Primary Examiner*—Peter D. Rosenberg
*Attorney, Agent, or Firm*—Lawrence B. Plant; George A. Grove

[57] ABSTRACT

A process and apparatus for the continuous pyrolitic decomposition of a feed material having an organic and an inorganic component and recovery of the inorganic component, carbon-free, for reuse in essentially the same material as from which it originally emanated inter alia. The apparatus includes a reactor assembly for receiving and pyrolitically decomposing the organic component of the feed material. The reactor assembly includes a screw-type conveyor assembly wherein the flights which convey the residue through a housing have openings therein to allow gaseous decomposition products to pass therethrough to preclude pressurization of the housing by the decomposition products. The inorganic residue has carbon thereon and may be cooled to an oxidation temperature in a non-oxidizing manner in a first cooling assembly. Without admitting ambient air into the cooling assembly the residue is transferred to an oxidation assembly where the carbon is oxidized to form gaseous carbon dioxide and is liberated from the inorganic residue. The inorganic residue is then cooled in a second cooling assembly and thereafter collected for reuse. The decomposition products are further processed in a condenser assembly wherein all condensable material is removed and the gaseous products are collected for reuse. The gaseous products are preferably used to fire the reactor assembly.

13 Claims, 2 Drawing Sheets

PYROLYSIS PROCESS AND APPARATUS

This is a continuation-in-part of application Ser. No. 07/473,519 filed Feb. 1, 1990.

FIELD OF THE INVENTION

The present invention relates to a pyrolysis reaction assembly and method for recovering an inorganic component for reuse from a feed stream having mixed organic and inorganic components of substantially known composition.

BACKGROUND OF THE INVENTION

Typically, polymer wastes or paint sludge containing a substantial volume of an inorganic filler component are disposed of via land fill. Disposal by land fill, however, has created an increasing problem because of lack of land fill space and the inability of polymers to rapidly degrade at the land fill site. In some states, paint sludge can not be land filled but rather must be incinerated at much greater expense. A known alternative to disposing of filled polymer waste and paint sludge by land fill is to pyrolyze the polymer or paint sludge to volatize the organic component and thus, separate the organic component from the inorganic component.

Pyrolysis is the thermal decomposition of organic matter at temperatures sufficient to volatize or gasify organic matter in the feed in the absence of oxygen or any oxidizing agent. By using a pyrolysis reaction, the inorganic components of the feed can be separated from the organic components and collected for re-use. The organic components are removed and disposed of in an environmentally safe manner.

Pyrolysis reaction assemblies are known in the prior art. In one such pyrolysis assembly, chunks of feed material (e.g. rubber tires) are introduced to a pyrolysis reactor through a reactor inlet having a cooling jacket thereon for preventing clogging of the inlet. The reaction chamber is free of oxygen or any oxidizing agent and is heated above the volatization point of any organic components of the feed material by a furnace assembly including a burner. An impeller shaft within the reaction chamber forces the inorganic and non-volatized residue progressively to an outlet. The volatized organic component is removed by a vapor outlet and is further processed. The processed organic gas has condensibles removed and is recycled and used to fuel the burner used to heat the reaction chamber. The inorganic residue having carbon residue thereon is cooled and collected for re-use.

A number of industries generate significant quantities of paint sludge and/or filled plastics such as car fluff, sheet molding compounds (SMC), reinforced reaction injection molding compounds (RRIM) and the reacting precursors of the aforesaid. If the inorganic filler component of such materials could be economically recycled for reuse into substantially the same material from which it emanated or for use in other applications, substantial reductions in landfill requirements and cost, as well as substantial reductions in the cost of fresh filler materials would result.

It is an object of the present invention to provide a method and apparatus for continuously pyrolytically decomposing the organic component of such organic - inorganic mixtures as filled polymers and paint sludge and recovering the inorganic component thereof in a carbon-free state useful as filler in substantially the same type of material from whence it emanated.

It is a further object of the present invention to provide a continuous method and apparatus by which a feed of mixed organic and inorganic material can be pyrolitically decomposed into a recoverable inorganic filler material free of any carbon or organic residue and gaseous organic decomposition products which can be disposed of in an environmentally safe manner.

It is a still further object of the present invention to provide an improved pyrolytic reactor assembly which includes a means for preventing pressurization of the reactor assembly during the pyrolytic reaction.

Other objects and advantages of the present invention will be readily appreciated as the same becomes better understood by reference to the following detailed description thereof considered in connection with the accompanying drawings wherein:

SUMMARY OF THE INVENTION

According to the present invention there is provided a pyrolysis reaction apparatus of the type for pyrolytic decomposition of a feed material having an organic and an inorganic component so as to continuously recover the inorganic component in a carbon-free form useful for recycling back into the same type of material from whence it emanated (i.e., SMC, RRIM, PAINT) as well as into other materials and to produce useful decomposition products of the organic component. The apparatus comprises reactor means (or pyrolyzer) for pyrolitically decomposing the feed material into gaseous decomposition products of the organic component and a solid residue comprising principally the inorganic component contaminated with carbon. The reactor means has an entrance end for receiving the feed material, an exit end for discharging the residue and mechanical conveyor means intermediate the entrance and exit ends for conveying the feed material slowly from one end of the reactor to the other. The assembly includes means for heating the reactor means to a pyrolysis temperature suitable to the decomposition of the feed material. Feeder means is provided at the entrance end for supplying the feed material to the reactor means. Conduit means is also provided for exhausting the gaseous decomposition products from the reactor means. Condenser means associated with the conduit means is provided for condensing combustible condensable liquids from the gaseous decomposition products while permitting combustible, substantially non-condensable, gases to pass therethrough. Also provided is a means for collecting the combustible liquid.

Depending on the composition of the filler sought to be recovered, the assembly may further comprise first cooling means the entrance end of which is in communication with the exit end of the reactor means for receiving and cooling the exiting residue in a substantially non-oxidizing environment to a superambient temperature suitable for the oxidation of the carbon content of the residue without degradation of the inorganic component of the residue sought to be recovered. The assembly further includes oxidation means the entrance end of which may either be in direct closed communication with the exit end of the reactor means or, where applicable (i.e. where temperature sensitive inorganics are involved), with the first cooling means for continuously receiving the residue from the reactor or first cooling means and reacting the carbon thereof with oxygen to form gaseous carbon-dioxide and liberate the same from the inorganic component. The oxidation means has an inlet end for receiving the residue from the reactor or first cooling means and an outlet end for discharging carbon-free inorganic components.

The assembly further includes means at the inlet end of the oxidation means for transferring the residue to the oxidation means including means associated therewith for isolating the reactor or cooling means against invasion of gases emanating from the oxidation means. The assembly further includes cooling means in communication with the outlet end of the oxidation means for continuously receiving and cooling the carbon-free inorganic component exiting from the oxidizer. The assembly further includes means for collecting the inorganic component for re-use.

DETAILED DESCRIPTION OF THE DRAWINGS

Figure 1:
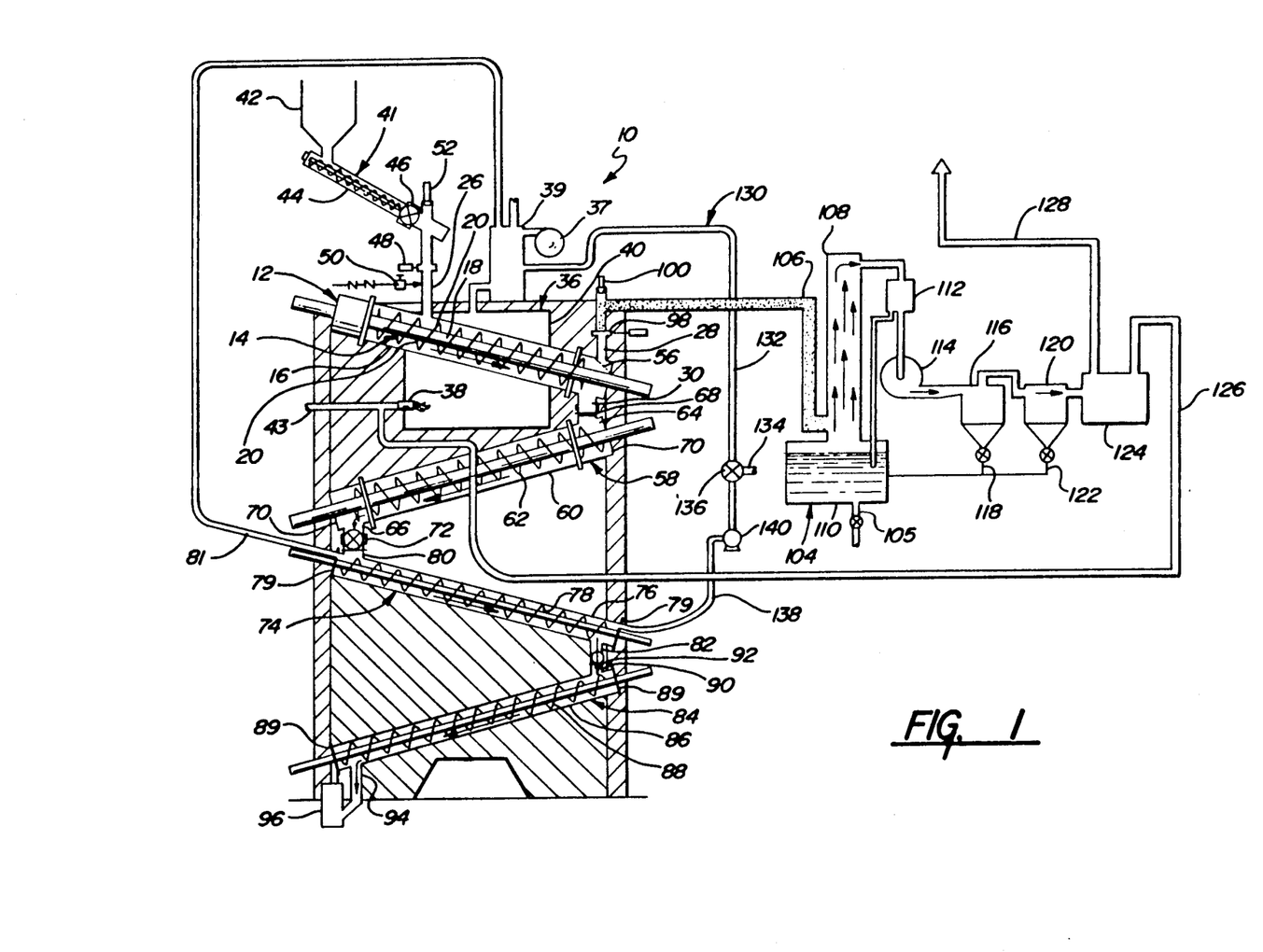
FIG. 1 is a schematic view of the pyrolysis reaction assembly and materials recovery system of the present invention.
Figure 2:
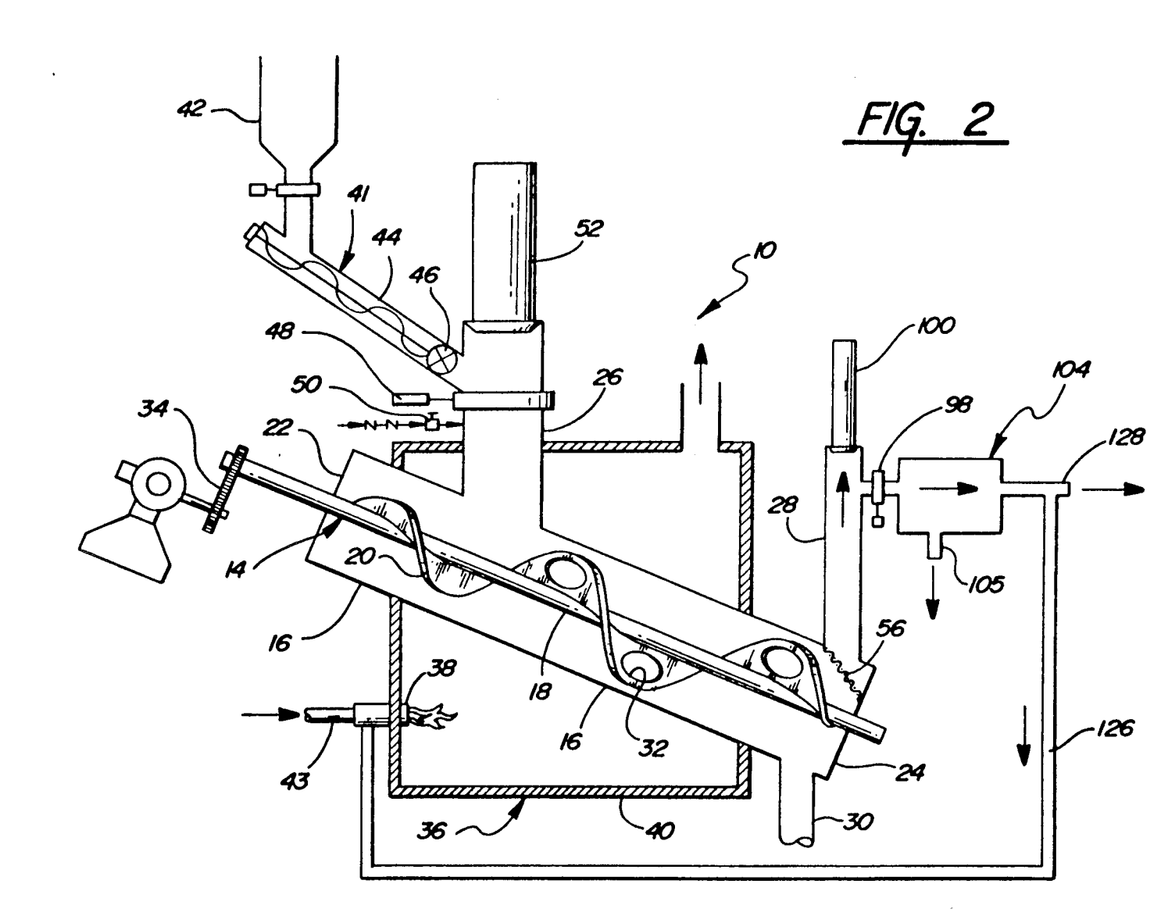
FIG. 2 is an enlarged cross-sectional view of the pyrolysis reaction assembly and gas treatment portion of the materials recovery system.

A pyrolysis reaction assembly of the type for pyrolitically decomposing a feed material having an organic and an inorganic component so as to continuously recover the inorganic component, carbon-free, and to produce useful decomposition products of the organic component is generally shown at 10 in the figures.

The assembly 10 includes a reactor assembly generally indicated at 12 for pyrolitically decomposing a feed material having organic and inorganic components into gaseous decomposition products of the organic component and a solid residue. The solid residue comprises principally the inorganic component of the feed which component is contaminated with carbon.

The feed materials to be pyrolitically decomposed are filled thermoset/thermoplastic polymers or paint sludge all of which have a mixed organic component and an inorganic filler material (e.g., glass reinforced). Examples of such polymer materials are reinforced reaction injected molded (RRIM) thermoset plastic materials which have an organic component that comprises substantially urethanes; unreacted precursors of the RRIM polymer i.e. polyols and isocyanates; waste sheet molding compounds (SMC) which have an organic component that comprises styrene cross-linked polyesters; uncured SMC reactants (commonly called "purged SMC") comprising styrene and unsaturated polyesters; and such epoxies, phenolics, silicates, melamines, diallylphthalates, and polyimides as are typically used in reinforced plastics. Paint sludge has an organic component that may comprise acrylics, polyesters or urethane, and solvents and cross-linkers therefor. Car "fluff" is the residue resulting from shredding of scrap automobiles and after the bulk of the metal content thereof has been magnetically removed therefrom and comprises a mixture of filled and unfilled plastics including foams, rubber, fabric, silica paper, and other organics as well as metal not removed by the magnet.

When the feed comprises SMC, the reusable inorganic filler component typically comprises calcium carbonate ($CaCO_3$) and glass which typically comprises about 48 weight percent and about 27 weight percent respectively of the SMC. When the feed comprises RRIM, the inorganic filler material to be recovered is glass which typically comprises about 15 weight percent of the RRIM. If paint sludge from an automobile plant comprises the feed, the inorganic and organic components comprise about 40% of the feed stream and the balance $H_2O$. About 75% of the non-aqueous contents is the organic and 25% recoverable inorganics, such as aluminum oxide ($Al_2O_3$), titanium dioxide ($TiO_2$), silica ($SiO_2$), barium sulphate ($BaSO_4$) and to a lesser degree metal components.

The feed may be mixed with other plastics which do not have a recoverable filler material. For example, reaction injected molded (RIM) plastics do not have an inorganic component but the polymer can provide considerable combustible oils and gases when pyrolyzed. These plastics may be added to or mixed with a feed having RRIM, SMC and particularly paint sludge where there is a need to ensure sufficient self-generated combustibles to heat the pyrolyzer. In this manner, the pyrolysis process recovers the organic component which has heat value which will be described subsequently. Further, the inorganic filler material from the RRIM and SMC materials is recovered and can be re-used. When mixing plastic material not having filler (e.g., RIM) with those having a filler material, it is desirable to keep the inorganic or filler component to a level of about 33 weight percent of the feed.

It has also been found desireable, in certain circumstances, to add chunks of used rubber tires to the organic mix being pyrolyzed. In this regard, it has been found, for example, that pyrolysis of RIM and/or RRIM materials alone results in the formation of very thick, viscous pyro-oil which tends to cause plugging of the screw conveyor in the pyrolyzer as well as gunking up of other parts of the system. As a result, more system maintenance is required. It has been found, however, that adding chunks of shredded rubber tires to the RIM and or RRIM materials in a volumetric ratio of about 50-50 and pyrolyzing them above about 1400° F. preferably at about 1500° F.) not only significantly reduces the viscosity of the pyro-oil, but also increases the relative amount of pyro-gas produced (i.e. yields a higher pyro-gas to pyro-oil ratio). The tire content of the mix may vary significantly with a corresponding affect on the viscosity of the pyro-oil and volume of the pyro-gas. In the case of RIM-tire mixtures, the primary recoverable carbon-free inorganic is iron (i.e. from the tires) which is decarbonized in the oxidizer in the same manner as described herein for decarbonizing $CaCO_3$ except there is no need to cool the residue between the pyrolyzer and the oxidizer. Similarly in the case of RRIM-tire mixtures, both glass and iron are recovered carbon-free and subsequently separated one from the other magnetically. The iron can be sold as scrap and the glass recovered and reused as described above. As with RIM-tire mixtures, it is not necessary to cool the RRIM-tire residue between the pyrolyzer and the oxidizer.

In the event that the feed comprises a solid plastic material, it is desirable that it first be cut or comminuted in to pieces about two-inches long in order to prevent clogging of the feeder and/or pyrolyzer. In the event that paint sludge is the feed material, no such comminution is necessary.

The reactor assembly 12 includes mechanical conveyor means 14 for progressively moving the feed material slowly through the reactor. The conveyor means 14 includes a stationary reactor housing 16, a central shaft 18 supported for rotation within the reactor housing 16 and a helically wound vane forming a plurality of flights 20 fixedly secured to the central shaft 18 for rotation therewith. The flights 20 convey the feed material and the solid residue slowly through the reactor housing 16 for progressive heating and pyrolysis thereof as it traverses the length of the pyrolyzer. Hence the feed material progressively changes from a polymer-rich material at the entrance end of the pyrolyzer to an essentially polymer-free filler at the exit end of the pyrolyzer. As can best be viewed in FIG. 2, the reactor housing 16 has an entrance end 22 and an exit end 24. The entrance end 22 includes an inlet 26 for receiving the feed material. The exit end 24 includes conduit means comprising a gas outlet 28 for exhausting the organic gaseous decomposition products from the reactor housing 16 and a residue outlet 30 for allowing the solid residue to exit the reactor housing 16.

The flights 20 at the entrance end 22 of the reactor housing 16 have a smaller amplitude than the flights 20 near the exit end 24 of the reactor housing 16. That is, the flights 20 at the entrance end 22 are spaced radially some distance from the walls of the reactor housing 16 and the flights 20 extend radially further outwardly from the shaft 18 and very near the walls of the reactor housing 16 at the exit end 24. Also the pitch or length of the flights 20 becomes progressively longer in the direction of the exit end. This configuration forces the feed material and the residue material through the reactor housing 16 toward the exit end 24. At least one of the longer flights 20, that is the flights near the exit end 24 of the reactor housing 16, has an opening 32 therein. The opening(s) 32 allow the gaseous decomposition products which are formed in the pyrolytic reactor housing 16 to pass therethrough to the gas outlet 28 and thereby prevent pressurization of the reactor housing 16 by the decomposition products and reduce the incidence of plugging or jamming of the reactor by the solids therein. The central shaft 18 is rotated by any suitable motor assembly 34 (FIG. 2).

To further aid movement of the feed material and residual material through the reactor housing 16, the reactor housing 16 is inclined such that the entrance end 22 is at a height relatively higher than the exit end 24. Preferably, the angle of inclination is about 30°. By utilizing an assembly which is inclined, gravitational forces will aid movement of the feed material and solid residue through the reactor housing 16.

The reactor assembly 12 further includes a furnace assembly generally indicated at 36. The furnace assembly 36 is for heating the reactor housing 16 to a predetermined pyrolysis temperature. The reactor housing 16 and furnace assembly 36 comprise a retort for pyrolitically decomposing the feed material. The temperature to which the reactor assembly 12 is heated by the furnace assembly 36 is determined by the composition of the feed material being utilized. It is desirable to operate the reactor assembly at a temperature of about 75° F. above the vaporization temperature of the organic component of the feed. By operating at this temperature, charring of the organic component is minimized, and hence the amount of carbon contamination on the solid residue is also minimized. Hence, for example, a suitable pyrolysis temperature for SMC will typically be 1300° F. plus or minus 50° F. and 1450° F. plus or minus 50° F. for RRIM and paint sludge.

The furnace assembly 36 includes a burner 38 which preferably burns a gaseous organic material. The furnace assembly 36 further includes an insulated furnace wall for retaining the heat of the burner 38. Preferably, the burner 38 is initially fired with natural gas supplied from an outside source through a conduit 43. The burner 38 is later fired with the recovered gaseous decomposition products from the pyrolytic reactor 16 (i.e., the uncondensible pyrogases). That is, once the pyrolysis reaction has begun and the organic decomposition products have been recovered, they are sent to the burner via conduit 126 and burned in place of outside natural gas or in admixture therewith. Hence once initiated, the process can be essentially self sustaining energy wise. The exhaust gas from the furnace assembly is supplied to a heat exchanger 39 as diagrammatically shown in FIG. 1. At the heat exchanger 39, heat removed from the burner exhaust gases is used to initially heat the inlet air supplied to the oxidation assembly by the supply conduit assembly generally indicated at 130. The supply conduit assembly 130 includes a hot air supply conduit 132 and an ambient air supply conduit 134. The hot air supply conduit 132 and ambient air supply conduit 134 are each connected to a mixing valve 136 whereat the flow from each conduit 132, 134 can be regulated. An oxidizer supply conduit 138 is also connected to the mixing valve 136 and receives the resultant air mixture from the two supply conduits 132, 134. The oxidizer supply conduit 138 includes a means for forcing air through all of the supply conduit assembly 130. This means may comprise a compressor 140 or any other device to force the air through the supply conduit assembly 130 (FIG. 1).

The assembly 10 further includes feeder means generally indicated at 41 at the entrance end 22 of the reactor housing 16 for supplying the feed material to the reactor housing 16. The feeder means 41 comprises a feed hopper 42 into which the feed material is initially placed. The feed material is transferred from the feed hopper 42 to the inlet 26 of the reaction housing 16 by an appropriate conveying assembly. As shown in FIGS. 1 and 2, a screw type conveyer 44 is used to transfer the feed from the feed hopper 42 to the inlet 26. Depending upon the type of feed material, different conveying assemblies may be utilized. For example, when the feed material comprises SMC, a feed auger as shown in FIG. 1 may be used to convey the feed material from the feed hopper 42 to the inlet 26. To convey semi-solids such as paint sludge, a ramp feeder, as well known in the art, is used to transfer the feed material from the hopper 42 to the inlet 26 of the reactor housing 16. If the feed comprises a liquid, a centrifugal pump may be used.

The feed material passes through a rotary air lock 46 prior to entering the inlet 26. The rotary air lock 46 prevents air from entering the inlet 26 and thereby the reactor housing 16 while allowing the feed material to pass into the inlet 26. The feed material also passes through a gate valve 48 prior to entering the inlet 26.

The inlet 26 further has an inert gas inlet valve 50 connected thereto for allowing an inert gas to enter the reactor housing 16. Prior to feeding the feed material from the hopper 42 to the inlet 26 and prior to heating the reactor housing 16, air is purged out from the reactor housing 16 by introducing an inert gas, preferably nitrogen, through the inert gas inlet 50 to flood the reactor housing 16. The pyrolysis reaction is carried out in the absence of oxygen so as to avoid potentially dangerous rapid oxidation and the potential formation of toxic gases depending on the composition of the feed. By excluding oxygen, this risk is prevented.

Hence, to pyrolitically decompose the feed material, the feed material passes through the rotary air lock 46 and the gate valve 48 into the inlet 26 and to the reactor housing 16 which is purged of oxygen by flooding the reactor housing 16 with nitrogen. The reactor housing 16 has been preheated to a predetermined temperature by the furnace assembly 36.

The feed material passes continuously into the reactor housing 16 where it is progressively volatized or gasified and decomposed over a period of about 20 minutes to about 30 minutes as it traverses the length of the pyrolyzer. The recoverable gaseous decomposition products pass through a filter or screen 56 and to the gas outlet 28. The screen 56 prevents any non-gaseous residual material from passing to the gas outlet 28.

In order to prevent the inlet 26 from becoming plugged, an automatic cleaning system comprising a plunger or ram 52 (see FIG. 2) is automatically periodically inserted into the inlet 26 at predetermined time intervals to relieve any clogging or accumulation of the feed material. Similarly, as best viewed in FIG. 2, an automatic cleaning assembly comprising a plunger or ram 100 is positioned over the gas outlet 28. An automatic force is periodically applied to the ram 100 to force the ram downwardly into the outlet 28 to thereby clear any solid restrictions or accumulation which may build up in the gas outlet 28. The filter 56 is moved during such cleaning so as to permit solids to be ejected through residue outlet 30.

As was previously stated, the solid residue is formed during the pyrolysis reaction The solid residue comprises the inorganic filler material of the feed contaminated with carbon. The residue is conveyed by the flights 20 to the residue outlet 30 of the reactor housing 16. Depending on the composition of the filler, the residue outlet 30 is connected either to a first cooling means or assembly, generally indicated at 58 or directly to an oxidizer means. More specifically when the residue comprises a temperature sensitive material such as calcium carbonate it is wise to cool the filler (i.e. to below 1350° F. for $CaCO_3$) to prevent its thermal decomposition into CaO and $H_2O$ especially during the exothermic oxidation step that follows. When used, the first cooling assembly 58 is in direct closed communication with the residue outlet 30 of the reactor housing 16. The first cooling assembly 58 receives and progressively cools the inorganic residue from the reactor assembly 16 in a substantially non-oxidizing environment as it traverses from one end to the other of the cooling means 58. By using a closed connection between the reactor housing residue outlet 30 and the first cooling assembly 58, ambient air is prevented from contacting the solid residue and entering the pyrolysis reactor.

The first cooling assembly 58 comprises a screw type conveyor including a housing 60 and an auger 62 supported for rotation within the housing 60. A suitable motor (not shown) rotates the auger 62. The housing 60 of the first cooling assembly 58 has an inlet 64 and an outlet 66 at the opposite end of the housing 60 from the inlet 64. The inlet 64 of the first cooling assembly 58 is connected by an air-tight, expansion joint 68 to the residue outlet 30 of the reactor housing 16. The inlet 64 of the first cooling assembly 58 is elevated to a height relatively higher than the outlet 66 for gravity assist in moving the residue through the housing 60. Preferably, the angle of inclination between the outlet 66 and the inlet 64 is about 30°. The first cooling assembly 58 further has removable covers 70 on the ends thereof which allow easy clean up of the interior of the housing 60.

The first cooling assembly 58 cools the solid temperature sensitive residue material to a superambient temperature less than that in the pyrolyzer but still suitable to readily oxidize the carbon content of the solid residue without degrading the inorganic component of the residue. Hence, the temperature to which the residue is cooled is dependent upon the make-up of the inorganic material. Preferably, the residue is cooled to approximately 1150° F., plus or minus 25° F. when the feed comprises SMC. RRIM, polyol, car fluff, or paint sludge do not require cooling because of their relatively temperature insensitive filler content, glass and metal. As a practical matter, however, these materials will be processed in the same equipment as the SMC and accordingly may also conveniently be cooled if so desired, or simply passed through the cooling section without any particular attempt to control the cooling thereof therein.

The residue, cooled or not, then passes through a second rotary air lock 72 into an oxidation means or oxidation assembly generally indicated at 74. The oxidation assembly 74 is operative to continuously receive the cooled solid residue and to react the carbon therein with an oxidizing agent, preferably oxygen (e.g. air), to form gaseous carbon dioxide and liberate the same from the inorganic component. The second rotary air lock 72 allows the solid residual material to pass from the first cooling housing 60 to the oxidation assembly 74 without allowing any air or carbon dioxide to enter the first cooling housing 60. By using a first rotary air lock 46 and a second rotary air lock 72, the reactor housing 16 and first cooling housing 60 are kept free of any oxygen once they have been purged by the inert gas.

The oxidation assembly 74 includes a screw-type conveyer having a housing 76 and an auger 78 supported for rotation within the housing 76. The housing 76 has removable covers 79 on the ends thereof to allow easy cleaning of the interior thereof. A suitable motor (not shown) rotates the auger 78 within the housing. Further, the oxidation assembly 74 has an inlet 80 in direct closed communication with the outlet 66 of the first cooling assembly 58 through the rotary air lock 72. This prevents the residue from contacting ambient air as it passes from the first cooling housing 60 to the oxidation housing 76. The oxidation assembly 74 further includes an outlet 82 for discharging the carbon-free inorganic component. The inlet 80 of the oxidation assembly 74 is elevated to a height greater than the outlet 82. The preferred angle of inclination is about 30°. This allows a gravitational force to aid movement of the solid residual/inorganic filler material through the housing 76 to the outlet 82.

The oxidation assembly 74 is kept at substantially the same temperature as the residue exiting the first cooling assembly 58. That is, the temperature is about 1150° F., plus or minus 25° F. for $CaCO_3$ treatment. The oxidation housing 76 is initially heated to the required temperature by hot air heated by the exhaust of furnace assembly 36 in the heat exchanger 39. That is, the mixing valve 136 is opened or regulated such that the supply of hot air from the conduit 132 and the supply of ambient air from the conduit 134 results in a hot air stream in the conduit 138 equal to the oxidation temperature. Initially most of the air will be supplied through the hot air supply conduit 132. After the oxidation process has begun, heat is given off due to the exothermic oxidation reaction. Hence after initiation, cooler air is substituted for the heated air to maintain the desired temperature in the housing 76. This is conveniently accomplished by regulating the mixing valve 136 to permit ambient temperature air or a mixture of ambient temperature air and preheated air to obtain a supply of air to the oxidation housing 76 through the conduit 138 which air is at the desired temperature.

The air is allowed to be introduced to the oxidation housing 76 through the conduit 138. This air is prevented from moving to the first cooling housing 60 by the second rotary air lock 72. The air, and in particular, the oxygen in the air, reacts or oxidizes the carbon to form gaseous carbon dioxide which liberates the carbon from the inorganic filler material. The carbon dioxide enriched air removed from the oxidation housing 76 may be passed to the heat exchanger 39 through a conduit 81 and the heat removed therefrom in the heat exchanger 39. Any residual heat from the $CO_2$-enriched air stream or from the furnace exhaust (i.e. that not used in the process to provide preheat air to the oxidizer) can be used elsewhere (e.g. to form steam for other plant operations). The $CO_2$-enriched air exiting the oxidation assembly 74 may further be passed through a milk of lime solution [i.e., $Ca(OH)_2$] to precipitate $CaCO_3$ and thereby reduce the amount of $CO_2$ vented to the atmosphere. Where appropriate, and in the case of the pyrolysis of SMC any $CaCO_3$ collected at this location may be added to that recovered as solid residue from the oxidation assembly 74 and reused.

As was previously stated, the second rotary air lock 72 prevents air from entering the first cooling housing 60 through the outlet 66 of the first cooling housing 60. The second rotary air lock 72 further provides a means disposed between the cooling assembly 58 and the inlet 80 of the oxidation housing 76 for transferring the cooled solid residue to the oxidation housing 76 while isolating the first cooling assembly 58 against invasion of gases emanating from the oxidation housing 76. That is, in addition to preventing air from entering the first cooling assembly 58, the rotary air lock 72 prevents the gasified carbon dioxide from entering the first cooling assembly 58. In the absence of a first cooling assembly, a similar air lock would be used for coupling the pyrolyzer reactor directly to the oxidizer.

A second cooling means or assembly generally indicated at 84 is provided for continuously receiving and cooling the carbon-free inorganic filler material exiting the oxidation housing 76. The second cooling assembly 84 comprises a screw-type conveyor having a housing 86 and an auger 88 supported for rotation in the housing 86. The housing 86 has removable covers 89 thereon for allowing easy cleaning of the interior of the housing 86. A suitable motor (not shown) rotates the auger 88 within the housing 86. The second cooling assembly 84 has an inlet 90 connected in direct closed communication to the outlet 82 of the oxidation housing 76 through an expansion joint 92. Further, the second cooling housing 86 has an outlet 94 at the opposite end thereof. The inlet 90 of the second cooling assembly 84 is at a height relatively higher than the outlet 94. Preferably, the angle of inclination between the outlet 94 and the inlet 90 is about 30°. This angle allows gravity to aid in feeding the inorganic filler material from the inlet through the housing 86 to the outlet 94.

The carbon-free inorganic filler materials formed in housing 76 are transferred to the second cooling assembly housing 86 through the expansion joint 92 wherein they are then cooled to approximately 300° F., plus or minus 25° F. The carbon-free residue comprises either $CaCO_3$ and/or glass from the SMC, glass from the RRIM scrap, $TiO_2$, $Al_2O_3$, silica ($SiO_2$), barium sulphate ($BaSO_4$) and/or other fillers and extenders from the paint sludge respectively and metal and siilca from the car fluff. These are all inorganic filler materials to be recovered and re-used depending on which type of feed material is utilized. The inorganic filler materials are collected in substantially their original (i.e. chemically) form in a storage bin 96 which is connected directly to the outlet 94 of the second cooling assembly 84. SMC residue typically comprises chunks of $CaCO_3$ and glass fibers wherein the glass fibers are shorter than in the original feed stock as a result of being broken by the impellers of the several screw conveyors. Paint residue typically comprise about 400 micron powder The recoverable organic gaseous materials or decomposition products formed in the pyrolysis reaction housing 16 are also treated. The gases formed in the housing 16 pass through the screen 56, and a gate valve 98 as shown in FIG. 2. After the gases pass through the gate valve 98, they pass to a gas condenser means or assembly generally indicated at 104. The gas condenser assembly 104 is connected to the reactor housing gas outlet 28 and receives the gaseous decomposition products. The gaseous decomposition products include condensable and non-condensable organic material. The gas separation assembly 104 separates the condensable organic material from the non-condensable material by condensing the condensable organic material to a liquid (hereinafter sometimes referred to as pyro oil) for discharge through a drain line 105. This leaves only the non-condensable organic gaseous material (hereafter sometimes referred to as pyro gases).

Initially, the gaseous decomposition products having both condensable and non-conde components are carried through pyrogas conduit 106 and introduced to the bottom of a condensing tower 108 having oil therein comprising principally condensate from reactor exhaust gases. The oil is in counterflow contact (not shown) with the incoming gaseous material and removes some of the condensable material from the organic gaseous mixture. That is, the oil flows downwardly through the upstanding condensing tower 108 and contacts the gas which flows upwardly and in the direction of the arrows of FIG. 1 and through the tower. The cool oil condenses the condensibles therein and collects at the base 110 of the condensing tower 108. The gas then flows through an impingement separator 112 to further separate the condensable material from the non-condensable gaseous material. Pyro oil from the base 110 is recirculated back to the top of the tower 108. The gas is then passed through a blower 114 which is preferably a three speed vacuum blower and to a cooling cyclone 116. The blower can be adjusted so as to prevent pressurization of the reactor housing 16. In the cooling cyclone 116, the remaining condensable material (i.e. pyro oil) is liquefied and removed from the non-condensable material (i.e., pyro gas) and drains through the drain line 118 to the base 110 of the condensing tower 108. A second cooling cyclone 120 may also be provided for removing further condensable material from the non-condensable organic gaseous material. A second drain line 122 is then required to drain the condensable material from the cooling cyclone 120 to the base 110 of the condensing tower 108. The drain line 105 connects to the base 110 of the condensing tower 108 and is opened to remove pyro oil from the system as it accumulates. The pyro oil so removed is combustible and may be used by itself to fire appropriate burners or preferably used in admixture with other oil (e.g. heating oil) for recovering the heat value therein.

The non-condensed gaseous decomposition products (i.e., pyro gas) are sent to a distributor 124. At the distributor 124, the pyro gases are separated into two streams. The first provides an outlet 126 for allowing the pyro gases to be recycled to the burner 38 of the reactor assembly 14 where they are burned to provide heat to the reactor housing 16. The second provides an alternative outlet 128 which leads to a storage facility (not shown) so that the pyro gases can be stored for later use.

The method of recovering a temperature sensitive inorganic filler material (e.g. $CaCO_3$) from a continuous feed of mixed organic and inorganic material (e.g. SMC) is generally as follows.

Firstly, a feed material (e.g. SMC) is continuously conveyed through the pyrolytic reactor housing 16 to progressively pyrolyze the organic component of the feed mixture as the feed slowly traverses the reactor housing 16. The pyrolysis reaction forms gaseous decomposition products and a carbon-contaminated solid residue of inorganic material (e.g. $CaCO_3$). The pyrolyzer, or reaction assembly 12 operates at a predetermined superambient temperature which is chosen depending upon the type of feed material to be used and will generally be at least about 75° F. higher than the vaporization temperature of the organic component of the feed material.

The hot residue exits the reactor housing 16 and is conveyed through the substantially oxygen-free first cooling housing 60. The residue is cooled in the first cooling housing from the first temperature (pyrolysis temperature) to a second superambient temperature selected on the basis of the composition of the inorganic material to permit ready oxidation of the carbon on the inorganic material without deleteriously affecting the inorganic material.

While the residue is at the second superambient temperature, it is transferred from the first cooling assembly 58 to the oxidation assembly 74 which is maintained at approximately the second superambient temperature. The residue is conveyed through the oxidation assembly 74 in the presence of oxygen, which oxygen is initially preheated to the second superambient temperature. The oxygen reacts with or oxidizes the carbon contamination on the inorganic filler material to gasify the carbon by forming carbon dioxide to remove or liberate the carbon from the inorganic filler material.

More specifically, operation of the assembly 10 is as follows. Solid feed material such as SMC or RRIM is comminuted into approximately two-inch size feed stock and placed in the feed hopper 42. The reactor housing 16 and first cooling housing 60 are then purged of oxygen by introducing nitrogen through the inert gas inlet 50. Once the nitrogen has been added to the reactor housing 16 and the first cooling housing 60, the burner is fired using natural gas from an outside source. The reactor housing 16 is brought to and maintained at the first superambient temperature of approximately 1200° F. to 1500° F., depending upon the type of feed material (e.g. 1300° F. ±50° F. or 1450° F. ±50° F. for RRIM or paint sludge). The feed material is then introduced through the rotary air lock 46 and to the inlet 26 of the reactor housing 16. Once inside the reactor housing 16, the feed material is pyrolitically decomposed into a solid residue having carbon contamination thereon and a gaseous decomposition product having condensable and non-condensable components.

The solid residue is forced through the housing 16 by the flights 20 within the reactor housing 16. The solid residue passes through the outlet 30 and an expansion joint 68 and to the inlet 64 of the first cooling housing 60. In the case of RRIM, paint sludge, car fluff or the like, the pyrolyzer may be coupled directly to the oxidizer. In the first cooling housing 60 (when used), the residue is cooled to the second superambient temperature which is approximately 1150° F., plus or minus 25° F. The solid residue is forced through the housing 60 by the auger 62 and to the outlet 66 of the first cooling assembly. The outlet 66 has a rotary air lock thereon for allowing the cooled residue to pass to the inlet 80 of the oxidation housing 76. In this manner, the cooled solid residue is transferred to the oxidation housing 76, which is immediately adjacent the first cooling chamber 60 while at the second superambient temperature, without exposing the cooled residue to ambient air.

In the oxidation chamber, which is kept at approximately the second superambient temperature of 1150° F., plus or minus 25° F., the residue contacts air and is continuously oxidized by the oxygen in the air to gasify the carbon by forming gaseous carbon dioxide to thereby separate the carbon from the inorganic residue. During oxidation of the residue, the air and carbon dioxide which is formed during the oxidation process are prevented from entering the cooling chamber by the rotary air lock 72. Hence, the oxidation reaction turns any residual carbon on the inorganic filler material into gasified carbon dioxide. The inorganic filler material passes through the oxidation housing 76 to the outlet 82 and through an expansion joint 92 to the inlet 90 of a second cooling assembly. The carbon dioxide may be vented to the heat exchanger 39 through the conduit 81 to help heat the heat air initially supplied to the oxidation housing 76.

The inlet 90 of the second cooling assembly allows the inorganic filler material to enter the second cooling housing 86. The inorganic filler material is forced through the housing 86 by the auger 88. In the second cooling housing 86, the inorganic filler material is cooled to approximately 300°, plus or minus 25° F. The carbon free inorganic filler material is then discharged through the outlet 94 of the second cooling housing 86 and to a storage bin 96.

The recoverable gaseous decomposition products formed during the pyrolytic reaction in the reaction housing 16 are sent to a condensing assembly wherein the condensable component (i.e. pyro oil) of the gaseous decomposition products are condensed to leave only a non-condensable gaseous material (i.e. pyro gases). More specifically, the gaseous decomposition products pass through the screen 56 and through the outlet 28 of the reactor housing 16, through a gate valve 98, and to a cooling tower 106. In the cooling tower 106, pyro oil is passed over the gaseous material to separate additional pyro oil from the gaseous material by liquefying the same. The pyro oil is recovered in the base 110 of the cooling tower 106. The remaining gaseous material is sent to an impingement separator 112 wherein further pyro oils are removed. Finally, the gaseous material passes through a blower 114 to at least one cooling cyclone 116, 120 wherein the remaining pyro oils are condensed to leave only non-condensable pyro gases.

The pyro gases are sent to a distributor 124 wherein a portion is recycled through the line 126 to the burner assembly 38 to eliminate the need to fire the burner 38 by an outside natural gas source. Finally, a portion of the pyro gases is sent through the line 128 to storage for further use.

The carbon-free reside produced from the process-/apparatus of the present invention can be reused in the same type of material (i.e. SMC, RRIM). from which it emanated as well as other applications. Hence, for example, the $CaCO_3$/glass residue chunks can be ground into five (5) micron or less powder and used to replace up to about 50% of the $CaCO_3$ that would otherwise be used in SMC and about 2% of the filler otherwise used in RRIM. This same material has been used with mortar and found to produce concrete which has more than 7% greater compressive strength than 100% mortar has. SMC residue ground to less than about 100 microns powder is useful as a filler in concrete paint. Paint sludge residue ground to about 5 microns can replace up to about 10% of the filler content of automotive paint primer, up to about 2% of the filler content of dark-colored commercial topcoat paint and a significant amount of the filler in anti-chip automobile paint.

It will be appreciated that the process/apparatus of the present invention can be used to pyrolize many other feed materials having mixed organic and inorganic components, including toxic materials. For example, it has particular value in the pyrolyzation of chlorinated hydrocarbons, such as polyvinylchloride (PVC) compounds in admixture with SMC. Typically, when PVC compounds are burned (2900° F.) they give off toxic combustion products such as dioxins. To avoid this, $CaCO_3$ has been used heretofore during burning to consume the chlorine and prevent the formation of dioxins. Using the process/apparatus of the present invention, PVC compounds are mixed with SMC compounds containing $CaCO_3$ and pyrolyzed as described above at a temperature above the decomposition temperature of $CaCO_3$ (preferably at 1500° F.-1600° F.). This causes the $CaCO_3$ to readily react with chlorine and thereby detoxify the exhaust gases. The $CaCl_2$ formed is then simply leached from the residue. Hence, the present process can be utilized to dispose of many compounds (including toxins) in an environmentally safe manner.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims the invention may be practiced otherwise than as specifically described.

The embodiments of the invention in which an exclusive property or privilege is claimed are defined as follows:

1. Apparatus for the continuous pyrolytic decomposition of a feed material having an organic and an inorganic component so as to continuously economically recover said inorganic component carbon-free in a useful form and to produce useful decomposition products of said organic component, said apparatus comprising:
    reactor means for pyrolitically decomposing said feed material into gaseous decomposition products of said organic component and a solid residue comprising principally said inorganic component contaminated with carbon, said reactor means having an entrance end for receiving said feed material and an exit end for discharging said residue;
    first conveyor means for mechanically conveying said feed material through said reactor means between said entrance and exit ends for progressively heating and pyrolyzing said feed material as it traverses said reactor;
    means for heating said reactor means to a pyrolysis temperature suitable to the pyrocytic decomposition of said organic component;
    feeder means at said entrance end for supplying said feed material to said reactor means;
    conduit means for exhausting said gaseous decomposition products from said reactor means;
    condenser means associated with said conduit means for condensing combustible condensable liquids from said gaseous decomposition products while permitting combustible, substantially non-condensable gases to pass therethrough;
    oxidation means in closed communication with said reactor means for continuously receiving said residue from said reactor means and reacting the carbon thereof with oxygen to form gaseous carbon dioxide and liberate same from the inorganic component, said oxidation means having an inlet end for receiving said residue from said reactor means and an outlet end for discharging carbon-free said inorganic component;
    second conveyor means for conveying said residue through said oxidation means between said inlet and outlet ends;
    means between said reactor means and said inlet end of said oxidation means for transferring said residue to said oxidation means including means associated therewith for isolating the cooling means against invasion of gases emanating from said oxidation means;
    cooling means in communication with said outlet end of said oxidizer for continuously receiving and cooling said carbon-free inorganic component exiting from said oxidation means; and
    means following said cooling means for collecting said inorganic component for re-use.

2. An apparatus according to claim 1 wherein said first conveyor means comprises a reactor housing, a central shaft supported for rotation in said housing, and a plurality of flights fixedly secured to said central shaft for rotation therewith to convey the feed material and the solid residue through said reactor housing, at least one of said flights having an opening therein for allowing the decomposition products to pass therethrough whereby pressurization of said reactor housing by the decomposition products is prevented.

3. An apparatus according to claim 1 including means for flooding said reactor with inert gas during heat up to purge said reactor of oxygen.

4. An apparatus according to claim 1 including means for automatically periodically cleaning said feeder means to prevent accumulation of said feed material therein.

5. An apparatus according to claim 1 including means for automatically periodically cleaning said conduit means to prevent the accumulation of any solids therein.

6. An apparatus according to claim 2 wherein said entrance end of said reactor housing includes an inlet for allowing the feed material to enter said reactor housing, said exit end of said reactor housing includes said conduit means thereon for exhausting the gaseous decomposition products from said reactor, and a residue outlet for allowing the solid residue to exit said reactor housing, said entrance end being elevated to a height relatively higher than said outlet end and sufficient to facilitate the movement of said feed material and residue through said reactor housing.

7. An apparatus according to claim 1 comprising a cooler means intermediate said reactor means and SMC oxidation means for cooling said residue prior to the introduction thereof into said oxidation means.

8. An apparatus according to claim 1 wherein said heater means comprises at least one gas-fired burner and said apparatus further includes means for conducting said combustible non-condensable gases to said burner for burning thereat.

9. An apparatus according to claim 1 wherein each of said inlets of said cooler means, oxidation means, and cooling means being elevated to a height relatively higher than said outlet of said cooler means, oxidation means and second cooling means respectively.

10. An apparatus according to claim 8 including heat transfer means for preheating said oxygen with heat from the exhaust gases from said burner.

11. An apparatus according to claim 1 including filter means in said gas outlet for preventing the solid residue from passing through said conduit means and to said condenser means.

12. A screw-type conveyor assembly of the type for use in a pyrolytic decomposition reactor for conveying a partially gasifiable material therethrough and subject to pressurization from a gaseous material formed by gasifying a portion of the partially gasifiable material comprising:

a housing;

auger means supported for rotation in said housing for conveying the partially gasifiable material through said housing as said auger means rotates in said housing;

said auger means including gas passage means therein for allowing the gaseous material to pass through said auger means so as to preclude the pressurization of said assembly by the gaseous material formed therein whereby the gaseous material can pass through said auger means and said housing when said auger means is rotating or stationary with respect to said housing.

13. An assembly as set forth in claim 12 further characterized by said auger means comprising a central shaft supported for rotation in said housing and having a plurality of flights fixedly secured to said shaft for rotation therewith, said gas passage means comprising an opening through at least one of said flights.

* * * * *